April 26, 1932.  L. F. CHASE  1,855,222
TRANSMISSION FOR INTERNAL COMBUSTION ENGINES
Filed Oct. 9, 1926
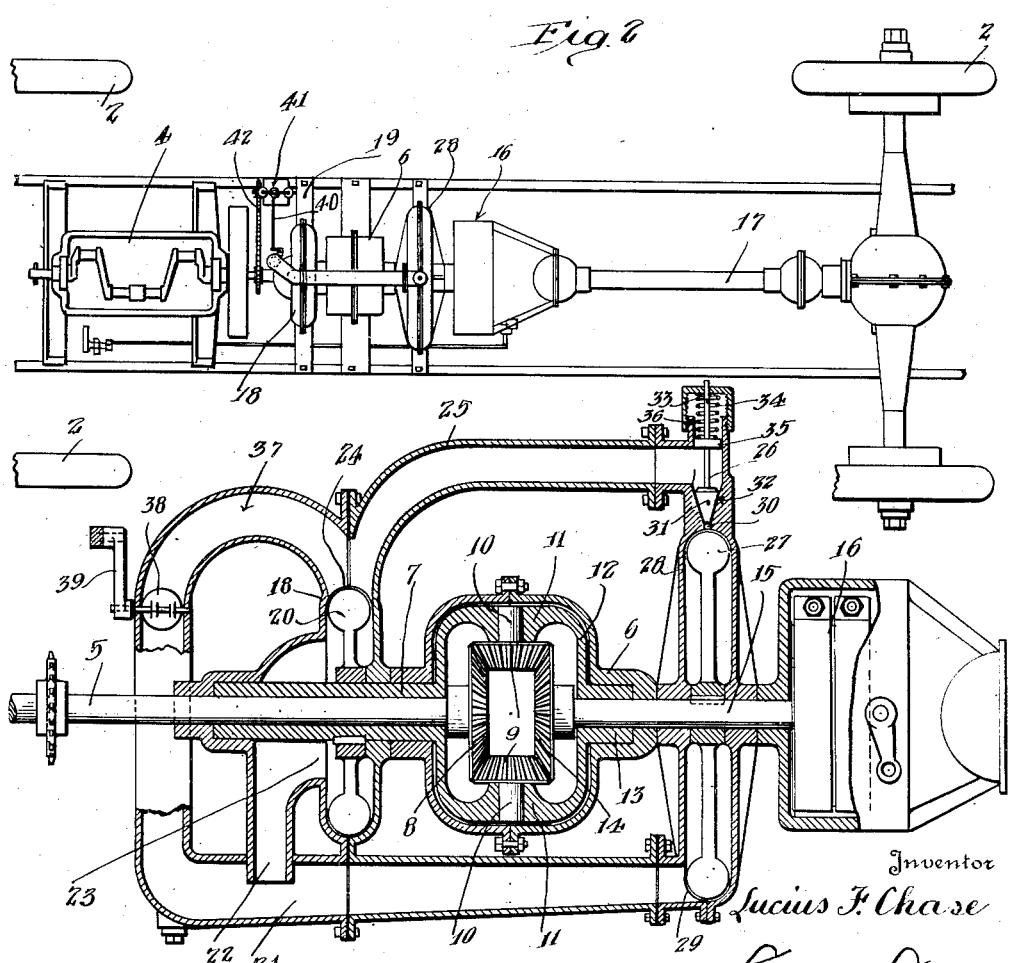
Inventor
Lucius F. Chase
By Lyon & Lyon
Attorneys Patented Apr. 26, 1932

1,855,222

UNITED STATES PATENT OFFICE

LUCIUS F. CHASE, OF LOS ANGELES, CALIFORNIA

TRANSMISSION FOR INTERNAL COMBUSTION ENGINES

Application filed October 9, 1926. Serial No. 140,525.

This invention relates to transmissions and is more particularly directed to a transmission for internal combustion engines.

In the case of an internal combustion engine, the power which is developed by the ignition of the fuel is, roughly speaking, proportionate to the speed. In an electric motor or steam engine on the contrary, within reasonable limit, the same horse power is developed irrespective of the speed. They will either develop a greater force at a lower speed or will develop or provide a smaller force at a higher speed. When the resistance or force to be overcome by an internal combustion engine becomes greater than the force it can apply at that speed, the internal combustion engine cannot adjust itself to this greater force to be overcome by slowing down as can the steam engine or electric motor, but the same is forced to stop altogether. The internal combustion engine has a further disadvantage, in that it must be kept running whether the vehicle is moving or not. For this reason it is not possible as the standard practice with electric motors or steam engines to directly connect the same to the travel unit.

It is therefore common practice in internal combustion engine use, as applied to motor vehicle construction, to provide a means whereby the driven mechanism may be started after the engine is running. Such a means is now standard practice and constitutes a clutch which enables the engine to be gradually attached to the driven mechanism so that a direct connection between the two is gradually established.

It is therefore an object of this invention to provide a means for connecting an internal combustion engine with the driving wheels of a motor vehicle so that the change of gear transmission and clutch may be eliminated and so that the power applied by the internal combustion engine for driving the said drive wheels of the vehicle may be applied to the driving wheels at substantially the same horse power irrespective of the speed of operation of the driving wheels.

Another object of this invention is to provide a hydraulic transmission drive connection between an internal combustion engine and the driven wheels thereof which is automatic in operation and so that the force applied from the internal combustion engine to the driving wheels will be automatically compensated for that required by the resistance to the drive of the driven wheels with a conservation of power and without the necessity of operating the clutch so that the car may be operated and controlled as to speed solely by the use of a throttle and brake, as in the case of a steam engine with the addition of only a simple reversing mechanism.

Other objects and advantages of this invention will be apparent from the following detailed description of a preferred embodiment thereof as illustrated in the accompanying drawings, in which drawings:

Figure 1 is a side elevation of a motor vehicle illustrating a transmission as embodied in this invention as connected between the power motor unit and the driven wheels.

Figure 2 is a top plan view thereof.

Figure 3 is a sectional plan view of the transmission mechanism embodied in this invention.

In the preferred embodiment of this invention, illustrated in the accompanying drawings, 1 illustrates the frame of a motor vehicle which may be of any desired or preferred type of construction and which is mounted upon wheels 2 and is provided with a steering wheel 3.

Mounted in the frame 1, preferably at the forward end thereof, is a motor 4 of the internal combustion type, such, for example, as employing gasoline for fuel. The motor 4 is preferably directly connected with a shaft 5.

Mounted on the shaft 5 is a differential housing 6, which differential housing 6 is journaled on a quill shaft 7 through which the shaft 5 is extended. The quill shaft 7 is journaled on the drive shaft 5.

Secured to the rear end of the shaft 5 is a mitre gear 8, which mitre gear 8 meshes with a pair of mitre gears 9, which mitre gears 9 are secured to shafts 10 which are journaled in bosses 11, preferably formed integral with a spider 12 which is mounted within the differential housing 6. The spider 12 is directly connected with or formed integral with the quill shaft 7.

Journaled in the boss 13, formed in the spider 12 and provided at its inner end with a mitre gear 14, is a driven shaft 15. The mitre gear 14 of the driven shaft 15 is mounted in position in mesh with the mitre gear 9 and extends through the housing 6 and is connected through a planetary reverse mechanism 16 of well known type with the shaft 17. The shaft 17 is connected to any suitable or customary or desirable type of differential with the driving wheels 2.

It will be apparent from the foregoing that if the resistance encountered by the wheels 2 is greater than the resistance required to rotate the spider 12, that the spider 12 when driven through the mitre gear 8 from the shaft 5 will rotate around the mitre gear 14 and will not rotate the shaft 15 to drive through the planetary drive mechanism 16 of the shaft 17 to drive the driving wheels 2.

Means are provided for flexibly and automatically connecting the shaft 5 with the shaft 15 so that the force applied through the said means will be sufficient to overcome the greater resistance encountered by the driving wheels 2 than that necessary for rotating the spider 12 around the mitre gear 14, which means are preferably of the following construction:

Journaled on the quill shaft 7 is a hydraulic pump housing 18, which hydraulic pump housing 18 is connected with the differential housing 6. The pump housing 18 is provided at its opposite sides with outwardly extending brackets 19 which are secured to the frame 1.

Mounted within the housing 18 is a hydraulic rotor 20 of any suitable or desirable construction, and which rotor 20 is keyed or otherwise secured to the quill shaft 7. A casing 21 provides a hydraulic fluid containing sump which is mounted below the rotor 20. The casing 21 may be of any desirable or suitable construction and is connected through a conduit 22 which extends into the interior thereof with the inlet 23 of the hydraulic pump housing 18 to the rotor 20. The casing 21 is filled with oil or other suitable liquid and the rotor 20 pumps this fluid through the outlet 24 of the housing 18 through a conduit 25 past a regulator valve 26 to operate the rotor 27 of the hydraulic motor which is enclosed within the housing 28. The rotor 27 is keyed or otherwise secured to the shaft 15. The housing 28 is journaled on the shaft 15 and is secured to and supported by the differential housing 6. The liquid pumped by the rotor 20 passes through the housing 28, causing the rotor 27 to rotate to drive the shaft 15 and leaves the housing 28 through the outlet 29 thereof into the container 21. By this means, the resistance of the drive wheels 2 is overcome by the hydraulic pressure or force created by the rotor 20 operating through the hydraulic rotor 27 to drive the shaft 15 so that until the resistance to the travel of the wheels 2 is overcome, the rotor 27 is driven hydraulically with that force required to overcome this resistance, after which time, the drive will tend to establish itself directly through the mitre gears 8, 9 and 14 directly with the shaft 15.

Means are provided for building up hydraulic pressure by the rotor 20 in order to overcome the resistance encountered by the wheels 2, which means preferably comprises the valve 26 which is mounted within the inlet 30 to the rotor 27. The valve 26 comprises a needle valve head 31 which is mounted on the seat 32 and is connected with the valve stem 33, on which valve stem 33 a compression spring 34 is mounted to yieldably urge the valve head 31 downward against the seat 32.

Secured to the stem 33 is a plunger 35, which plunger 35 is mounted within a cylinder 36, within which cylinder 36 the compression spring 34 is mounted. The cross sectional area of the plunger 35 is greater than the area of the valve head 31 so that as the pressure builds up in the conduit 25, the plunger 35 will be forced upward against the pressure of the spring 34 to admit the liquid under pressure to the rotor 27 to drive the same.

The planetary drive 16 may be of any suitable or desirable construction and is of standard design, having means for permitting the connection of the shaft 15 with the shaft 17 so as to drive the wheels to cause the vehicle to travel in forward or reverse directions, or which planetary drive mechanism may be drawn to a neutral position to disconnect the shaft 15 from the shaft 17, all of which construction and operation is well understood in the art so that it is not believed necessary for applicant to specifically point out and describe the construction and operation of the same.

Means are provided for permitting the idling of the motor 4 and for stopping the power drive from the hydraulic pump rotor 20 to the hydraulic motor rotor 27, which means are preferably of the following construction:

Connected with the outlet 24 of the housing 18 and with the conduit 25 is a by-pass conduit 37, which by-pass conduit 37 is at its opposite end connected with the container 21.

Mounted in the by-pass connection 37 is a valve 38, which may be of any desired or preferred construction, and is herein illustrated as of the butterfly type. The valve 38 is connected with an operating lever 39, which operating lever 39 is connected through a rod 40 with a governor 41, which governor 41 may be of any desired or preferred construction. The governor 41 is driven through any suitable drive, such as illustrated at 42, from the shaft 5 so that as the motor 4 is set into operation and at idling speed thereof, the valve 38 will remain open to permit the rotor 20 to pump the liquid from the container around through the by-pass connection 37 and not to the motor rotor 27. As the speed of the motor 4 is increased after the governor 41 operates to close the valve 38, the rotor 20 will pump the liquid from the container or sump 21 (under such load conditions on the driven shaft 15 as to cause the differential sleeve 7 to be rotated) through the conduit 25 and by the valve 26 to operate or rotate the rotor 27 to drive the shaft 15.

Having fully described a preferred embodiment of my invention, it is to be understood that I do not wish to be limited to the exact details herein set forth, which may obviously be varied without departing from the spirit of my invention as set forth in the appended claims.

I claim:

1. In a transmission, the combination of a drive shaft, a driven shaft, a differential coupling between said shafts, a fluid pump adapted to be driven by the differential when said differential absorbs slip between drive and driven shafts, a fluid motor mounted on the driven shaft, a fluid connection connecting the fluid pump with the fluid motor for driving the said motor, and means mounted in the said connecting means for building up fluid pressure in said connecting means, said means being actuated by a predetermined fluid pressure in said connecting means to automatically release said pressure for driving the said motor.

2. In a transmission, the combination of a drive shaft, a driven shaft, a differential coupling between said shafts, a fluid motor mounted on the driven shaft, a fluid pump driven by the differential coupling, a fluid connection connecting the fluid pump with the fluid motor, and means mounted in said connecting means adapted to be activated by fluid pressure within said connecting means for admitting fluid to the fluid motor to drive the same.

3. In a transmission, the combination of a drive shaft, a driven shaft, a differential coupling between said shafts, a fluid motor mounted on the driven shaft, a fluid pump driven by the differential coupling, a fluid connection connecting the fluid pump with the fluid motor, means mounted in said connecting means adapted to be activated by predetermined fluid pressure within said connecting means for admitting fluid to the fluid motor to drive the same, by-pass means connected with the fluid pump for by-passing the fluid motor, a valve mounted in the by-pass means, and means activated by increase in speed of the drive shaft for gradually closing the valve whereby fluid pressure may be built up within the fluid connection between said pump and motor to actuate said means mounted in said fluid connection.

4. In a transmission, the combination of a drive shaft, a driven shaft, a sleeve on the drive shaft, a differential coupling between said drive shaft and driven shaft and including said sleeve, a fluid pump mounted on the sleeve and driven thereby, a fluid motor mounted on the driven shaft, a fluid connection connecting the fluid pump with said fluid motor for driving said motor, and means mounted in said fluid connecting means adapted to be activated by predetermined fluid pressure within said fluid connecting means for admitting fluid to the motor to drive the same.

5. In an automatically operated variable speed transmission, the combination of a driving shaft, a driven shaft, a differential coupling between said shafts, a fluid pump provided with a fluid inlet and two fluid outlets, a driving connection between said differential and said pump, a fluid motor mounted on the driven shaft and provided with a fluid inlet communicating with one of said pump outlets, a valve in said fluid connection to said motor inlet adapted to be actuated by predetermined fluid pressure at said inlet to admit fluid into said motor, a valve in the other of said pump outlets, and means, actuated by variations in speed of drive shaft, for operating said last named valve.

Signed at Los Angeles, California, this 27th day of Sept., 1926.

LUCIUS F. CHASE.